(12) United States Patent
Ashihara

(10) Patent No.: US 6,278,399 B1
(45) Date of Patent: Aug. 21, 2001

(54) RADAR APPARATUS AND METHOD FOR DETECTING MALFUNCTION OF RADAR APPARATUS

(75) Inventor: Jun Ashihara, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/506,936

(22) Filed: Feb. 18, 2000

(30) Foreign Application Priority Data

Feb. 22, 1999 (JP) .................................................. 11-042843

(51) Int. Cl.⁷ .............................. G01S 7/40; G01S 13/93; G08G 1/16
(52) U.S. Cl. .............................. 342/173; 342/70; 342/71; 342/72; 342/165; 342/175; 342/195; 702/183; 180/167; 180/169
(58) Field of Search .................................. 342/70–72, 89, 342/165, 169–175, 195, 27–29, 41, 61, 69, 73, 94–103, 118–124, 127–146, 159; 356/5.01–5.08; 702/182, 183, 184, 185, 186; 180/167, 168, 169

(56) References Cited

U.S. PATENT DOCUMENTS

| Re. 36,095 | 2/1999 | Urabe et al. . |
| 5,160,971 | * 11/1992 | Koshizawa .......................... 356/5.05 |
| 5,432,516 | 7/1995 | Cherry et al. . |
| 5,839,096 | 11/1998 | Lyons et al. . |

FOREIGN PATENT DOCUMENTS

| 0 840 140 A1 | 5/1998 | (EP) . |
| 2 286 307 | 8/1995 | (GB) . |
| 12-35479 | * 2/2000 | (JP) ................................ G01S/17/93 |
| WO 96/14591 | 5/1996 | (WO) . |

* cited by examiner

Primary Examiner—Bernarr E. Gregory
(74) Attorney, Agent, or Firm—Armstrong, Westerman, Hattori, McLeland & Naughton, LLP

(57) ABSTRACT

The radar apparatus of the present invention comprises a beam transmitter for radiating a radar beam, a beam receiver for receiving a reflected signal, a processor for calculating the position of the object, and a malfunction detecting device for detecting a malfunction of the radar apparatus. At least one of the area irradiated by the beam transmitter and a receiving area of the beam receiver overlaps with a movable area of a wiper blade of the wiper device, and the malfunction detecting device estimates that the radar apparatus is malfunctioning if a wiper passing signal to be detected does not appear in an output signal of the processor while a wiper movement detecting device detects that the wiper device is activated.

5 Claims, 6 Drawing Sheets

RADAR APPARATUS AND METHOD FOR DETECTING MALFUNCTION OF RADAR APPARATUS

BACKGROUND OF THE INVENTION

1. Field of the Invention

The present invention relates to a vehicular radar apparatus comprising a malfunction detecting device and a method for detecting a malfunction of the radar apparatus.

2. Description of Related Art

Vehicular radar apparatuses for detecting relatively approximate and immobile obstacles, such as trolley poles and concrete fences, in order to prevent vehicles (for example, automobiles) from colliding with the obstacles for example while parking the vehicle in a garage, have been conventionally implemented. Furthermore, in recent years, in addition to the radar apparatus for the detection of immobile obstacles as described above, research and development have been carried out for implementing a radar apparatus for the acquisition of moving objects over relatively long distances at high accuracy and at high speed. Such a radar apparatus can be used, for example, as an alarm system for preventing colliding with or rear-ending another car while driving, or an adaptive cruse control (ACC) used for auto cruising.

U.S. Pat. No. RE 36,095 which belongs to the assignee of the present application discloses a multi-beam radar apparatus which uses a high frequency beam in the millimeter waveband as a radar wave. This multi-beam radar apparatus comprises a plurality of transmitter receivers for radiating and receiving radar beams so that the radar beams spatially overlap with each other, and it is possible to improve the accuracy of detection by optimizing the combination of the transmitter and receivers.

European Patent Application No. EP0840140A1 filed by the assignee of the present application discloses a scanning beam radar apparatus which uses a high frequency beam in the millimeter waveband as a radar wave. In this scanning beam radar apparatus, a primary transmitter radiates a high frequency beam, and the beam is scanned by a rotating reflector. The scanned beam is converged by a dielectric lens in order to decrease the scanning angle of the beam, and is radiated toward the running direction of the vehicle.

However, in the above multi-beam radar apparatus, each of the transmitter receivers has an inherent detection area, and the position of a detected object, that is, the direction with respect to a vehicle and the distance between the object and the vehicle, is calculated by collating a plurality of data from the selected transmitter receivers. Therefore, when a malfunction or a sensitivity degradation due to deterioration occur in any one of the selected transmitter receivers, it becomes necessary to detect which receiver has a malfunction or a sensitivity degradation.

In contrast, in the case where the above scanning beam radar apparatus uses only one transmitter receiver, when a sensitivity degradation occurs in the transmitter receiver, it becomes necessary to compensate the sensitivity in all directions.

Also, in the above conventional radar apparatuses, in order to check the radar sensitivity, it is necessary to transport a vehicle comprising a radar apparatus to a predetermined position in a testing station where a reference object is provided and to activate the radar apparatus to measure its receiving sensitivity with respect to the reference object. Therefore, a periodic check of the conventional apparatus requires a laborious process and a high costs. Furthermore, in the conventional radar apparatuses, it is difficult to check the radar sensitivity at an arbitrary time other than the periodic checks.

Additionally, because the conventional radar apparatus is generally installed at the front or rear end of a vehicle, such as in a bumper or in a front grille, it is susceptible to the adverse effects of rain, snow, wind, dust, and mud. In particular, the radar sensitivity decreases when snow or mud is thickly attached to the radar apparatus. Accordingly, some countermeasure for preventing such effects is necessary. Furthermore, in the case of installing the radar apparatus in the vicinity of the engine compartment, it is necessary to improve the heat resistance of the radar apparatus, which increases the manufacturing costs of the radar apparatus.

SUMMARY OF THE INVENTION

The objective of the present invention is to provide a radar apparatus and a malfunction detection method in which it is possible to check the sensitivity of the radar apparatus under normal conditions of a vehicle without transporting the vehicle to a testing station, and to improving the sensitivity of the radar apparatus without requiring high cost.

Another object of the present invention is to prevent deposition of snow, mud, etc. on a passage of a radar beam and prevent errors in locating objects or deterioration of the sensitivity of the radar apparatus.

In order to achieve the above objectives, the radar apparatus of the present invention comprises:

- a beam transmitter for radiating a radar beam as a transmitted signal;
- a beam receiver for receiving a signal reflected by an object in an area irradiated by the radar beam;
- a processor for calculating the position of the object from the transmitted signal and the reflected signal; and
- a malfunction detecting device for detecting a malfunction of the radar apparatus;
- wherein at least one of the area irradiated by the beam transmitter and a receiving area of the beam receiver overlaps with an area over which a wiping member of a windshield wiper device, and the malfunction detecting device estimates that the radar apparatus is malfunctioning if a wiper passing signal to be detected does not appear in an output signal of the processor when the wiper device is activated.

According to this radar apparatus, because the wiping member intermittently crosses at least one of the radiated radar beam or the returning radar beam while the wiper device is activated, the radar beam is intermittently reflected, diffused, or absorbed by the wiping member. Therefore, in the receiving signals received by the radar apparatus, wiper passing signals having a characteristic waveform appear in synchronization with the movement of the wiper member. The malfunction detecting device estimates that the radar apparatus has an abnormality, such as a malfunction or deterioration of the sensitivity, if the wiper passing signal to be detected does not appear in an output signal of the processor when the wiper device is activated.

Therefore, in this radar apparatus, without transporting the vehicle to a special testing station, and regardless of the circumstances such as road conditions or state of the vehicle, it is possible to inspect the radar apparatus at a desirable time and place, for example, at the same time as a start-up inspection or during driving. The inspection can be performed intermittently or continuously while the wiper device is activated. Furthermore, the inspection can be automatically started by a driver's operation for activating the wiper device, and periodic inspections can surely be performed without requiring additional operations by the driver.

In addition, because the wiping member moves in front of at least one of the beam transmitter and beam receiver, it is possible to wipe off rain, snow, dust, mad, which may interrupt radar beams. Therefore, deterioration of the sensitivity of the radar apparatus can thereby be prevented or diminished, and reliability of the radar apparatus is improved.

This radar apparatus may comprise a wiper movement detecting device for detecting whether the wiper device is activated. In this case, the malfunction detecting device can estimate that the radar apparatus is malfunctioning if a wiper passing signal to be detected does not appear in an output signal of the processor while the wiper movement detecting device detects that the wiper device is activated.

The beam transmitter and the beam receiver may be assembled into a radar module to be installed on an inner surface of a windshield of the vehicle.

In this case, because the radar module is positioned in a cabin of the vehicle and is protected by the windshield, it is possible to diminish the requirements for the radar apparatus, of weather resistance such as water resistance, dust-proofness, and thermal resistance. Accordingly, the size and the manufacturing cost of the radar apparatus can be minimized, and also, it is possible to widen the visibility or sitting space of a driver or passengers.

The radar apparatus may comprise at least an attachment for fixing the radar module to on the inner surface of the windshield so that a front face of the radar module contacts the inner surface of the windshield.

In this case, the radar module can be easily installed in the vehicle at an accurate orientation without requiring complicated operations which are necessary in a conventional radar apparatus for adjusting the beam radiating direction with respect to the vehicle. Furthermore, because a radome for protection of the radar apparatus can be omitted, the manufacturing processes and costs can be reduced. Additionally, should the front or rear part of the vehicle be damaged, because the radar module is installed in the center part of the vehicle, damage to the radar module and the deviation of the radiation direction of the radar beam can be diminished.

On the other hand, the malfunction detecting method of the present invention uses a radar apparatus installed in a vehicle comprising a wiper device. The radar apparatus comprises a beam transmitter for radiating a radar beam as a transmitted signal, a beam receiver for receiving a signal reflected by an object in an area irradiated by the radar beam, and a processor for calculating the position of the object from the transmitted signal and the reflected signal, and at least one of the area irradiated by the beam transmitter and a receiving area of the beam receiver overlaps with the range of motion of a wiping member of the wiper device.

The method comprises: activating the wiper device to move the wiping member; radiating a radar beam by the beam transmitter and receiving the reflected signal by the beam receiver; and estimating that the radar apparatus is malfunctioning if a wiper passing signal to be detected does not appear in an output signal of the processor According to this method, the same effects as explained hereinbefore can be obtained.

DETAILED DESCRIPTION OF THE INVENTION

Referring to FIG. 1~FIG. 7, the preferred embodiments of the radar apparatus and a malfunction detecting method of the radar apparatus according to the present invention will be explained.

The radar apparatus according to the present embodiment comprises a radar module $1m$ installed in a cabin of an automobile (vehicle), and the radar module 1m includes antennas acting as a transmitting means and a receiving means.

Figure 2:
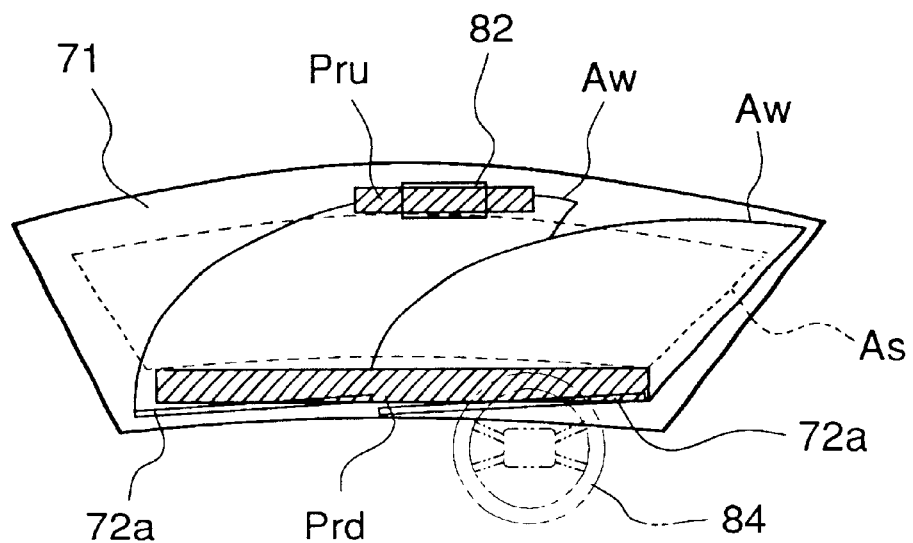
FIG. 2 is a rear view of a windshield of an automobile on which the radar apparatus is attached.

The position of the installation of the radar module $1m$ and the method for installing the radar module $1m$ will be explained. FIG. 2 is a rear view of the windshield 71 when looking from the interior of a cabin 81, and a wiper device 72 comprising a pair of wiper blades 72a as a wiping member is provided in the vicinity of the lower end of the windshield 71. The wiping member is not limited to the wiper blades 72a but it may be wiper arms or other movable parts of the wiper device 72. The wiper device 72 swings each of the wiper blades 72a in a wiping area Aw, and the wiping area Aw overlaps with a viewing area As which is necessary for a driver to drive the automobile. The positions preferable for installing the radar module $1m$ of the present invention are illustrated by the hatched areas Pru and Prd in FIG. 2, which are the areas excluded from the viewing area As and included in the wiping area Aw.

Figure 3:
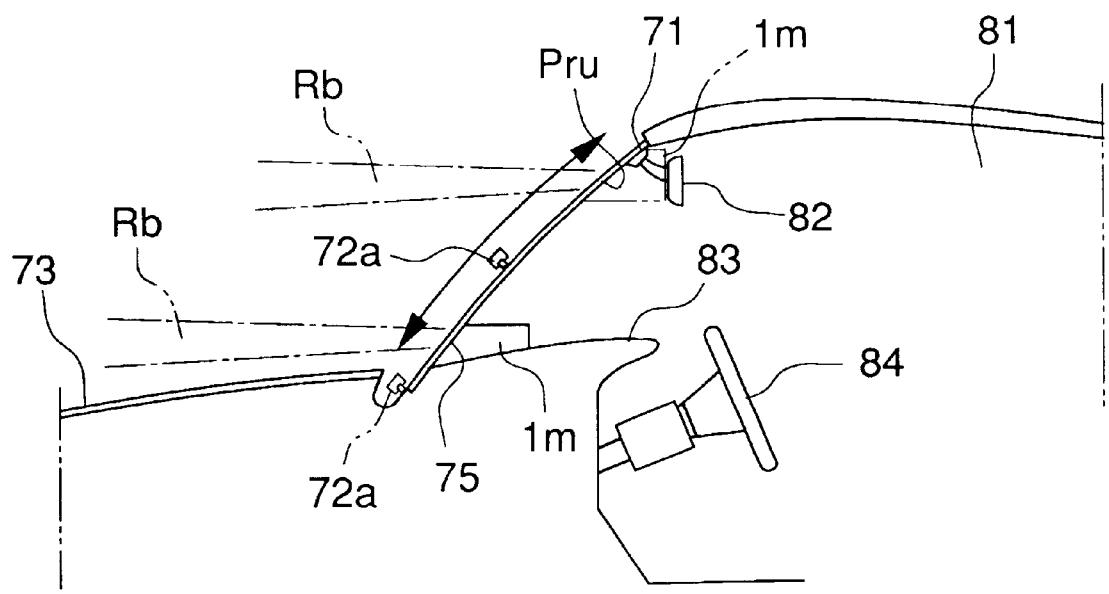
FIG. 3 is a sectional view of the windshield on which the radar apparatus is attached.
Figure 4:
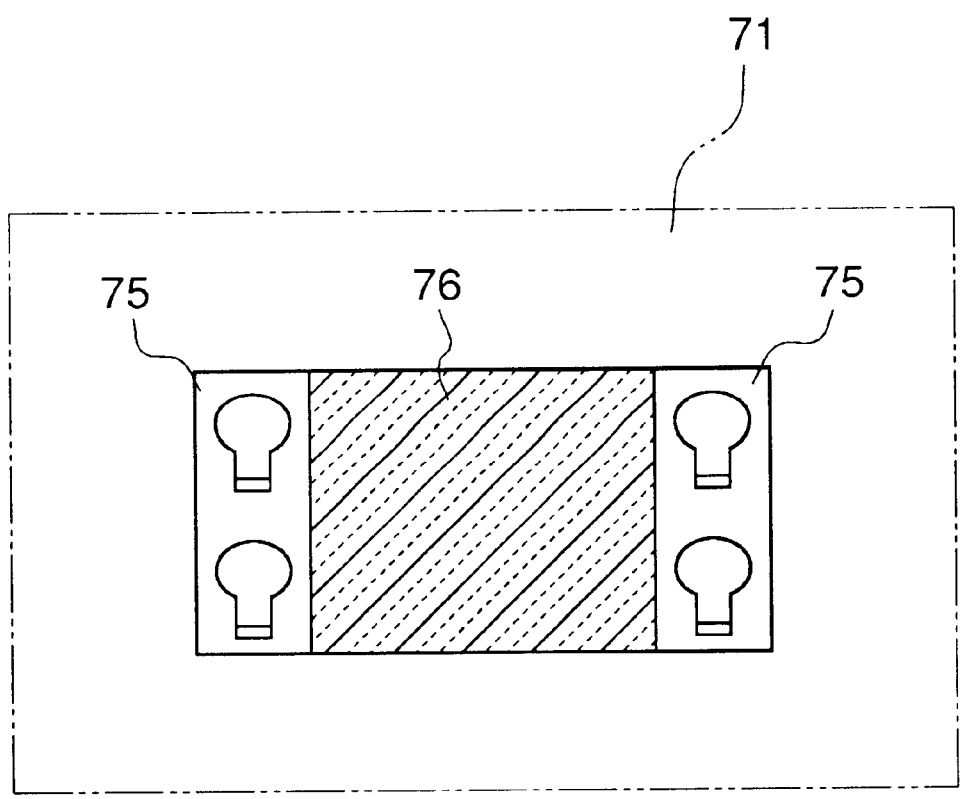
FIG. 4 is a rear view of an attachment member for fixing the radar apparatus on the windshield.

FIG. 3 is a sectional side view illustrating the windshield 71 and its vicinity. The upper area Pru is positioned on the upper end of the windshield 71 and behind a rearview mirror 82 along the line of vision of a driver. In the case where the radar module $1m$ is installed in this area Pru as shown in FIG. 3 by two dotted chain lines, the radar module $1m$ does not interrupt the view of the driver of the automobile, and it becomes unaffected by the beam reflection by the automobile body parts such as a bonnet. Furthermore, in the case where the radar module $1m$ is installed in the upper area Pru, it is possible to install the radar module $1m$ as an optional part of conventional automobiles without requiring a substantial alteration of the automobile.

On the other hand, the lower area Prd is positioned on the lower end of the windshield 71 and on the front end of a dashboard 83 in which gauges, an air conditioner control panel, and audio apparatuses, etc. are provided. Therefore, in this case, the radar module $1m$ is positioned in the line of vision of the driver toward the bonnet 73, and it does not interrupt the view of the driver while driving. Furthermore, in this case, because the radar apparatus is attached to the dashboard 83 or is accommodated in the dashboard as an integrated module, the number and total length of the wiring for electrically connecting the radar module $1m$ can be reduced, and additionally, the connection between the radar module and a computing unit of the automobile can also be eased.

When the radar module 1m is installed on the inner surface of the windshield 71 as described above, as shown in FIGS. 3 and 4, it is preferable to attach in advance, for example, by means of an adhesive, a pair of attachments 75 for mounting the radar module 1m, on the inner surface of the windshield 71. It is further preferable to provide a protective coating (or film) 76 on the inner surface of the windshield so as to face with the front face of the radar module 1m fixed by the attachments 75. The protective coating 76 is transparent to radar beams and is substantially nontransparent to sunlight, and it prevents overheating and ultraviolet ray degradation of parts of the radar module 1m. The attachments 75 and the protective coating 76 may be integrated in an unit, and furthermore, they may be integrally attached to the windshield 71 in the manufacturing process of the windshield 71.

According to the above structure, the radar module 1m can be easily installed in the automobile at an accurate orientation only by controlling the dimensions of the radar module 1m and the attachments 75 and controlling the position of the attachments 75 on the windshield, and it is possible to omit complicated operations which are necessary in a conventional radar apparatus for adjusting the beam radiating direction with respect to the automobile body after the installation of the radar apparatus.

Also, because the radar module 1m is installed so as to contact the inner surface of the windshield 75, it is possible to omit a radome which is necessary for a conventional radar apparatus to protect the front face of the radar apparatus, the manufacturing processes and costs can thereby be reduced.

Additionally, should the front part of the automobile be damaged, for example, by a light collision, because the radar module 1m is not installed at the front end of the automobile but is installed in the central part, damage to the radar module 1m and deviation of the radiation direction of the radar beam can be prevented.

Figure 6:
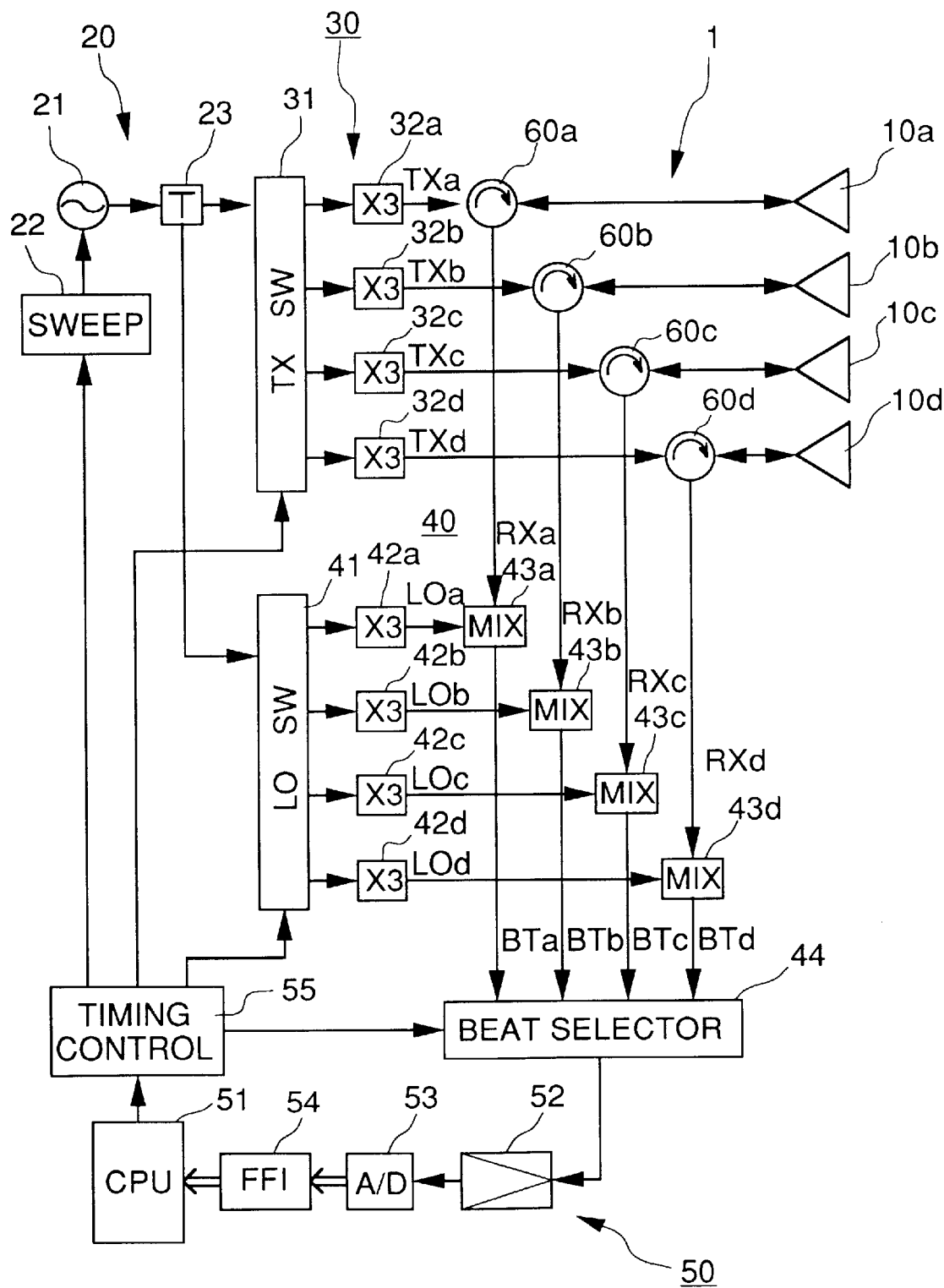
FIG. 6 is a block diagram illustrating an electrical circuit of the radar apparatus.

Next, the internal structure of the above radar apparatus will be explained referring to FIGS. 1 and 6. FIG. 6 is a block diagram of a time-sharing type FM-CW multi-beam radar apparatus according to an embodiment of the present invention, and this radar apparatus comprises four antennas 10a~10d, an FM wave generation circuit 20, a transmitter section 30 for 4 channels, a receiver section 40 for 4 channels, a detection/control section 50, and four directional couplers 60a~60d.

Figure 7:
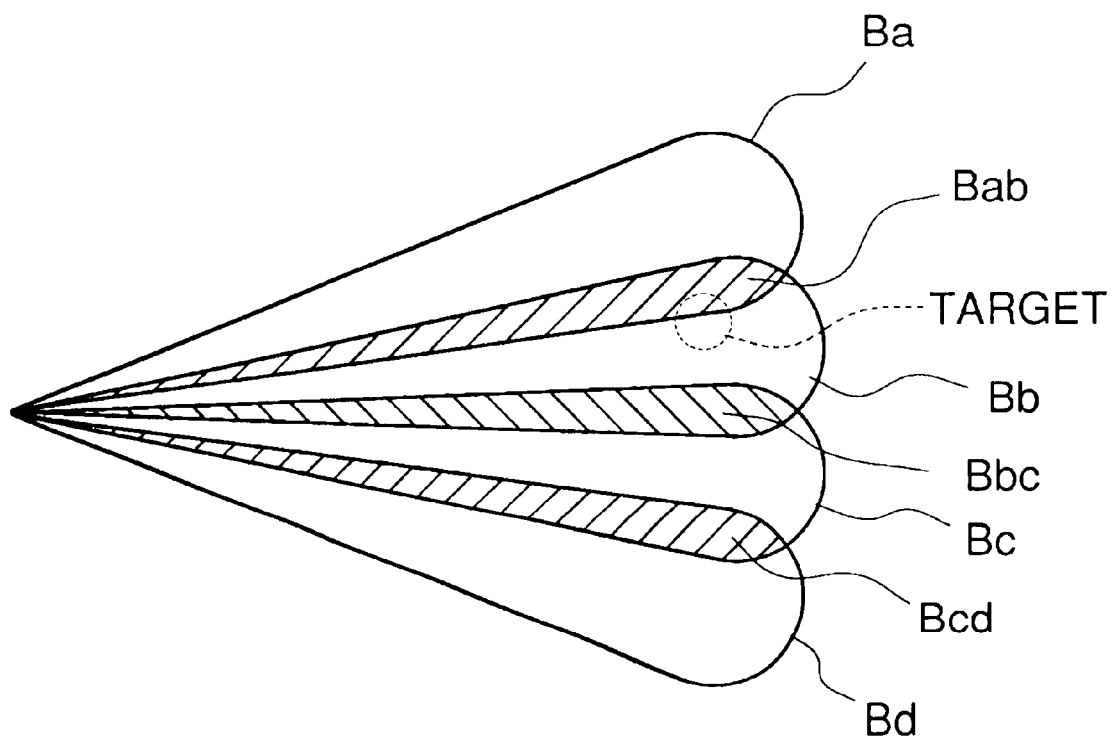
FIG. 7 is a plane view illustrating an example of a radiation pattern of radar beams in the radar apparatus.

The antennas 10a~10d may have respectively, for example, beam radiation ranges Ba~Bd of patterns shown in FIG. 7, and such antennas 10a~10d may be an offset defocus parabolic multi-beam antenna 11. The FM wave generation circuit 20 comprises a voltage controlled oscillator 21 for generating radio waves having wavelengths of 20~25 GHz in the semi-millimeter waveband, a sweep circuit 22 for applying to the voltage controlled oscillator 21 with a modulation voltage having a triangular wave shape, and a power-divider circuit 23 for dividing the modulated electrical power from the voltage controlled oscillator 21 and transmitting them respectively to the transmitter section 30 and the receiver section 40.

The transmitter section 30 comprises a transmitting switching circuit 31 for transmitting the electrical power supplied by the power-divider circuit 23 to one of the four antennas 10a~10d in turn, and frequency triple multiplier circuits 32a~32d for tripling the frequency of the electrical power respectively supplied by the switching circuit 31 into 60~77 GHz in the millimeter waveband. The frequency triple multiplier circuits 32a~32d are respectively connected to the antennas 10a~10d via the directional couplers 60a~60d.

The receiver section 40 comprises a local oscillating switching circuit 41 for switching the local oscillated modulated electrical power divided by the electrical power-divider circuit 23, frequency triple multiplier circuits 42a~42d for triplicating the frequency of the electrical power respectively supplied by the switching circuit 41 into the same wave length as the transmitting modulated electrical power, mixing circuits 43a~43d for mixing the electrical power supplied by the local oscillating switching circuit 41 with electrical power received by the antennas 10a~10d, and a beat selector 44 for selecting one of beat signals Bta~Btd output from the mixing circuits 43a~43d. The mixing circuits 43a~43d are respectively connected to the directional couplers 60a~60d.

The detection/control section 50 comprises a central processing unit (CPU) 51, an amplifying circuit 52, an analog-to-digital conversion circuit 53, a fast Fourier transform circuit 54, and a timing control circuit 55.

In this radar apparatus, the FM wave generation circuit 20 generates FM wave electrical power, and the transmitter section 30 tripled the FM wave electrical power and transmits the triplicated radar waves Txa~Txd having a wavelength of for example 60 GHz in the millimeter waveband, via one of the directional couplers 60a~60d, from one of the antennas 10a~10d in turn.

When at least one of the radar waves Txa~Txd radiated from the antennas 10a~10d is reflected by an object to be detected, the reflected radar wave is received by the antennas 10a~10d as reflected waves Rxa~Rxd, and the reflected waves Rxa~Rxd are separated by the directional couplers 60a~60d from the transmitted wave. In the receiving section 40, the mixing circuits 43a~43d respectively mix the reflected waves Rxa~Rxd with local oscillated FM modulated waves Loa~Lod to output beat signals Bta~Btd in turn at a timing controlled by the timing control circuit 55. The beat selector 44 selects one of the beat signals Bta~Btd in turn at a timing controlled by the timing control circuit 55 and transmits it to the detection/control section 50.

In the detection/control section 50, the amplifying circuit 52 amplifies the selected beat signal Bta~Btd, the analog-to-digital conversion circuit 53 converts the amplified beat signal to a digital signal, and the fast Fourier transform circuit 54 performs the frequency conversion of the digital signal to generate a signal having a power spectrum in which a peak appears at a frequency corresponding to the beat frequency. The central processing unit 51 calculates, from the power spectrum, the propagation delay time of FM waves with respect to each peak frequency having an intensity more than a predetermined level, and calculates the distance to the object. Also, the central processing unit 51 performs weighted averaged processing using the intensity of each peak in the power spectrum to calculate the direction of the object, and determines the position of the object using the calculated distance and direction.

As explained before, this radar apparatus is installed in the upper area Pru or the lower area Prd of the inner surface of the windshield 71 where a wiper blade 72a can pass by, therefore, the radiated or reflected radar beam RB is intermittently obstructed by the swinging wiper blade 72a when the wiper device is activated.

When the wiper blade 72a obstructs the radar beam RB in front of the radar module 1 m, a wiper passing signal is detected by the radar apparatus. The wiper passing signal has a waveform depending on the material forming the wiper blade 72a, the shape of the wiper blade 72a, and the relative position of the wiper blade 72a with respect to the radar apparatus.

Figure 5:
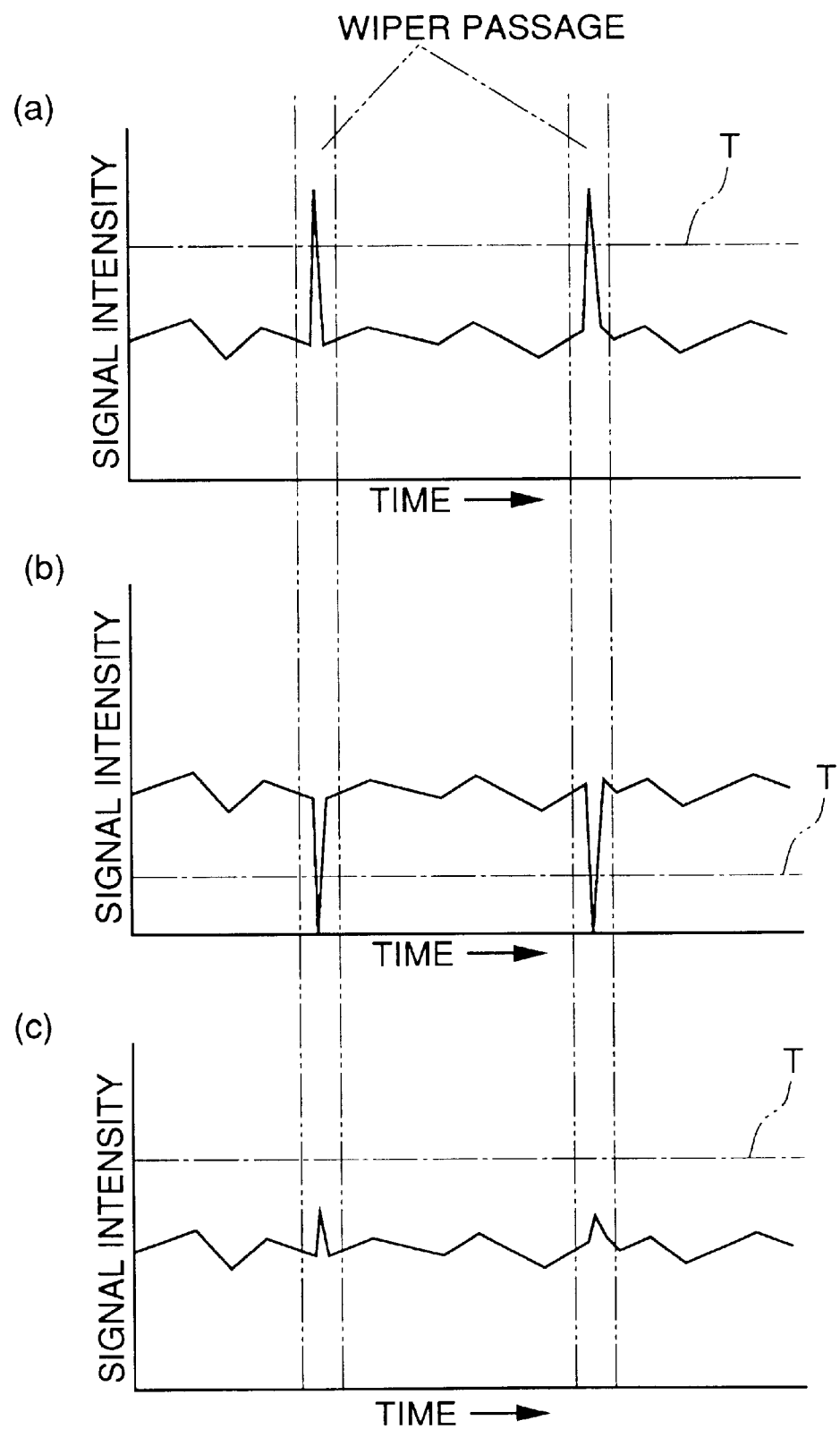
FIG. 5 is a graph showing output signals of the radar apparatus when a wiper device is activated.

FIG. 5 diagrammatically illustrate examples of the wiper passing signals detected by the radar apparatus in various cases. In the graphs (a)~(c) in FIG. 5, the abscissa means time, and the vertical axis shows the strength of signals.

The graph (a) in FIG. 5 shows wiper passing signals obtained in the case where the wiper blade 72a includes parts (blade hardware) made from a metal such as a ferroalloy. Because such a metal effectively reflect radio waves in the millimeter waveband, the radar beam in the millimeter waveband radiated from the antennas 10a~10d is reflected by the adjacent wiper blade 72a, and pulse-shaped wiper passing signals having high peaks appears in the received signals.

In contrast, the graph (b) in FIG. 5 shows wiper passing signals obtained in the case where the wiper blade 72a includes blade hardware made from a material which effectively absorbs radio waves in the millimeter band, or in the case where the wiper blade 72a has a shape which uniformly diffuses the radar beam forward the automobile. In these cases, because the wiper blade 72a absorbs or diffuses forward the radar beam radiated from the antennas 10a~10d, wiper passing signals appear as sharp decreases in the received signals.

Wiper passing signals similar to those shown in the graph (b) in FIG. 5 can be observed even if the wiper blade comprises parts reflecting the radar beam in the millimeter waveband, in the case where each of the transmitter section and the receiver section comprises an independent antenna and the wiper blade passes in front of one of the antennas, or in the case where each of the transmitter section and the receiver section comprises an independent antenna and two wiper blades pass in front of respective antennas.

The graph (c) in FIG. 5 shows wiper passing signals obtained when at least one of the transmitter section 30 and the receiver section 40 deteriorates and the sensitivity of the radar apparatus is reduced. In this graph (c), the wiper passing signals are weakened in comparison with those in the graph (a). Therefore, it is possible to estimate that a malfunction has occurred in the radar apparatus if the height of the detected wiper passing signals is smaller than a threshold (for example, it is shown as a line T in each graph in FIG. 5) predetermined based on a height to be detected when the radar apparatus is normal.

As described above, the radar apparatus of the present invention detects a malfunction of the radar apparatus while using the discriminative wiper passing signals produced by the action of the wiper device.

Figure 1:
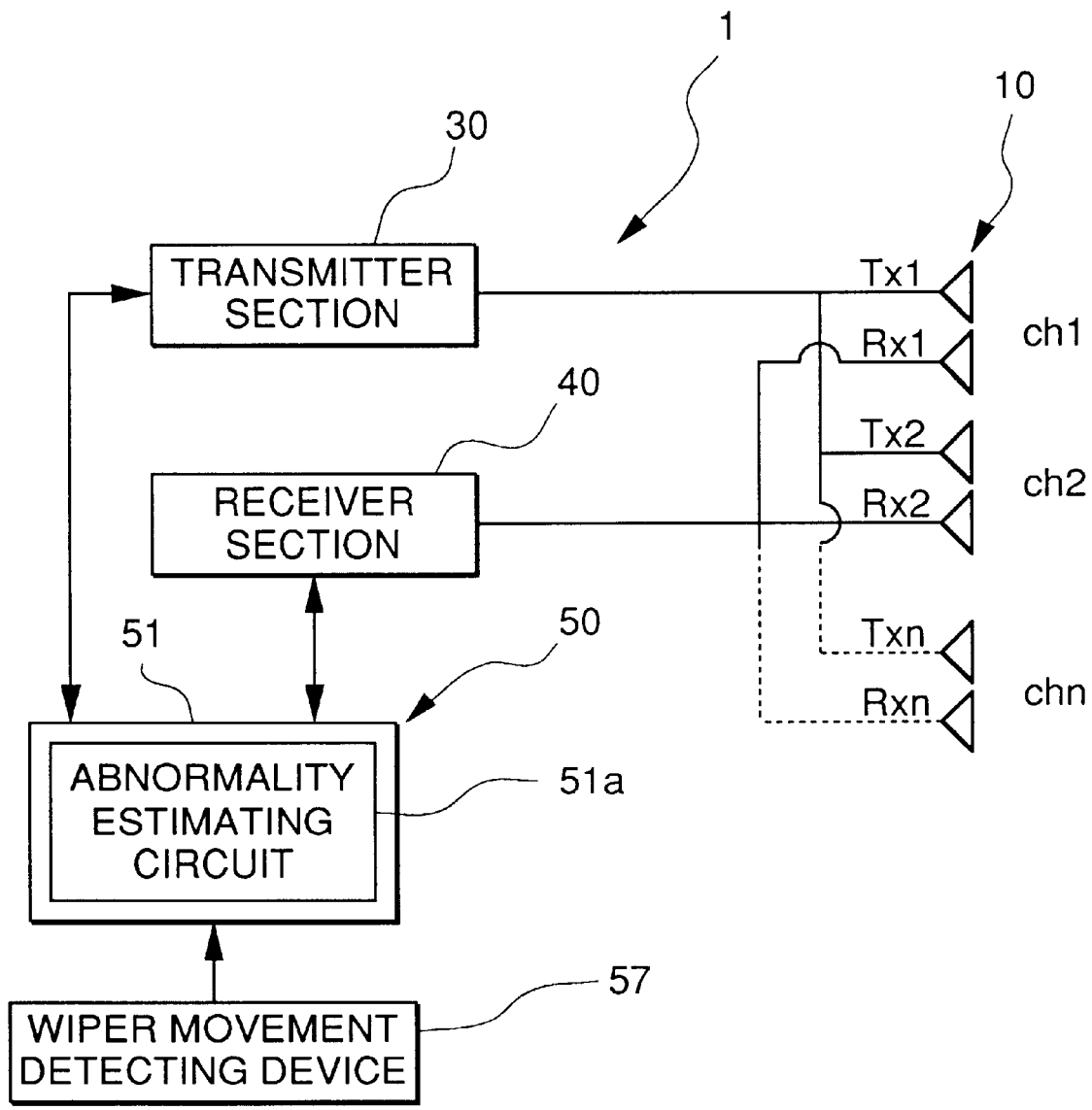
FIG. 1 is a block diagram of a radar apparatus according to the present invention.

FIG. 1 is a block diagram diagrammatically illustrating a multi-beam radar apparatus according to the present invention, and this apparatus comprises, in addition to the prescribed constitutions, a wiper movement detecting device 57 for detecting the movement of the wiper device, and an abnormality estimating circuit 51a for estimating a malfunction of the radar apparatus based on a wiper activating signal transmitted from the wiper movement detecting device 57 and the wiper passing signals. In this embodiment, the abnormality estimating circuit 51a is included in the central processing unit 51.

The wiper movement detecting device 57 is not limited in the present invention, however it may be a device as follows:

(1) a sensor device which detects, by means of a mechanical, optical, electrical, or magnetic method, the position of a wiper switch to be operated by a driver of the automobile.

(2) a detector which detects current flow in a wiper motor for actuating the wiper blade by means of a current detection sensor such as a relay.

(3) a detector which detects the rotational movement of a worm wheel of a wiper motor or a rotation axis of a wiper arm (retainer) by means of a rotational sensor connected to the worm wheel or the rotational axis.

(4) a detector which directly detects the movement of the wiper blade by means of an optical sensor or a magnetic sensor provided at a vicinity of the rest position of the wiper blade. The detector of this type can be provided inside the windshield, for example, on the inner surface of the windshield.

The abnormality estimating circuit 51a estimates that a malfunction occurs in the radar apparatus when wiper passing signals are not detected by the central processing unit 51 or their height is smaller than a predetermined threshold, even though a wiper activating signal is received from the wiper movement detecting device 57.

In the case (1) where the wiper movement detecting device 57 detects the position of a wiper switch, the wiper switch can be positioned in a plurality of positions so as to control the frequency of the movement of the wiper blade. For example, a fast mode, a normal speed mode, and an intermittent mode can be selected regarding the frequency of the wiper movement, and furthermore, in the intermittent mode, the pause time can be controlled. Therefore, it is preferable that the abnormality estimating circuit 51a estimates a malfunction of the radar apparatus based on signals corresponding to a period which is controlled in accordance with the selected frequency of the wiper movement. The selected frequency of the wiper movement can be detected based on the position of the wiper switch by the wiper movement detecting device 57.

Similarly, in the case (2) where the wiper movement detecting device 57 detects the current flow in a wiper motor, if continuous current flow is detected, the abnormality estimating circuit 51a preferably estimates a malfunction of the radar apparatus based on signals corresponding to a predetermined period, and, if intermittent current flow is detected based on signals corresponding to a period in which the number of current flows are counted to be a predetermined number.

In the case (3) where the wiper movement detecting device 57 detects the rotation or angle of a worm wheel of a wiper motor or a rotation axis of a wiper arm, it is possible to accurately detect the position of the swinging wiper blade. Therefore, in this case, it is possible to synchronously detect the wiper passing signal at the moment when the wiper blade obstructs the radar beam. The abnormality estimating circuit 51a may estimate based on only one wiper passing signal to be detected, or, it may estimate based on a predetermined number of wiper passing signals to be detected, for example, by calculating the frequency of abnormalities appearing in the wiper passing signals to be detected and judging whether the calculated frequency is greater than a predetermined threshold.

In the case (4) where the wiper movement detecting device 57 directly detects the movement of the wiper blade, it is also possible to accurately detect the position of the wiper blade. Therefore, the same estimating methods as those of the case (3) can be employed.

The abnormality estimating circuit 51a performs the estimation as described above with regard to each combination circuit consisting of one of the transmitter circuits and one of the receiver circuits included in the multi-radar beam apparatus, and it outputs to the central processing unit 51 an abnormal signal identifying the combination circuit in which an abnormality is detected.

On receiving the abnormal signal, the central processing unit 51 may indicate warning signal for informing the driver that a malfunction has occurred in the radar apparatus. For example, the central processing unit 51 may actuate a warning signal display provided at a position which a driver see, for example, in the instrument panel (or dashboard). The central processing unit 51 may also determine the position of the detected object while excluding the signals from the combination circuit detected to be abnormal.

According to the above radar apparatus and method, without transporting the automobile to a special testing station, it is possible for a driver to discover a malfunction in the radar apparatus even if the sensitivity of the radar apparatus is degraded for some reason during driving. Also, if necessary, the position of the object can be determined while excluding the signals from the combination circuit detected to be abnormal, and the accuracy of identifying the position of the object can thereby be improved.

Although the above embodiment comprises the wiper movement detecting device 57 for detecting the movement of the wiper device and automatically judges the malfunction of the radar apparatus, the radar apparatus may not comprise such a wiper movement detecting device. In this case, the abnormality estimating circuit 51*a* can be activated by manual control. It is also possible to operate the radar apparatus as follows. First, in the normal condition of the radar apparatus, while activating the wiper device, the radar apparatus is activated by pushing a memory button to obtain normal wiper passing signals. The data of the normal wiper passing signals are stored in an inner memory provided in the radar apparatus. Next, when a test of the radar apparatus is necessary, while activating the wiper device, the radar device is activated by pushing a malfunction detection button, and the abnormality estimating circuit 51*a* compares the obtained wiper passing signals with the normal wiper passing signals stored in the inner memory to estimate a malfunction of the radar apparatus in a similar manner as those explained above.

The radar apparatus may not be installed in a cabin of an automobile, but may be installed at any position at which a reflector or absorber of the radar beam intermittently obstructs the radiated radar beam or reflected radar beam. For example, at least one of the transmitter and the receiver of the radar apparatus may be installed in a front grille of the automobile, and a wiper device for moving a wiper blade may be provided in front of the transmitter and/or the receiver. In this case, the same effects as the above embodiment can be obtained.

Also, the present invention is not limited to the application for a FM-CW multi-beam radar beam apparatus using radio wave beam in the millimeter waveband, but the present invention can also be applied to a pulse radar apparatus or a scanning beam radar apparatus. Furthermore, the present invention may be applied to a radar apparatus (for example, a laser radar) using optical beams such as infrared light or intravital ultraviolet light. In this case, it is preferable to change the protective coating 76 provided on the inner surface of the windshield into a selective reflection coating which is transparent to the optical beams and is reflective to light other than the wavelength of the optical beams. Furthermore, the vehicle to which the present invention is applied is not limited to automobiles, but it can be other type of vehicles such as motorcycles, and motorboats.

What is claimed is:

1. A radar apparatus to be installed in a vehicle comprising a wiper device, comprising:

a beam transmitter for radiating a radar beam as a transmitted signal;

a beam receiver for receiving a signal reflected by an object in an area irradiated by the radar beam;

a processor for calculating the position of the object from the transmitted signal and the reflected signal; and a malfunction detecting device for detecting a malfunction of the radar apparatus;

wherein at least one of the area irradiated by the beam transmitter and a receiving area of the beam receiver overlaps with an area over which a wiping member of the wiper device moves, and the malfunction detecting device estimates that the radar apparatus is malfunctioning if a wiper passing signal to be detected does not appear in an output signal of the processor when the wiper device is activated.

2. A radar apparatus according to claim 1, further comprising a wiper movement detecting device for detecting whether the wiper device is activated, and wherein the malfunction detecting device estimates that the radar apparatus is malfunctioning if a wiper passing signal to be detected does not appear in an output signal of the processor while the wiper movement detecting device detects that the wiper device is activated.

3. A radar apparatus according to claim 2, further comprising at least an attachment for fixing the radar module on the inner surface of the windshield of the vehicle so that a front face of the radar module contacts the inner surface of the windshield.

4. A radar apparatus according to claim 1, wherein the beam transmitter and the beam receiver are assembled into a radar module to be installed at an inner surface of a windshield of the vehicle.

5. A method for detecting malfunction of a radar apparatus installed in a vehicle comprising a wiper device, the radar apparatus comprising a beam transmitter for radiating a radar beam as a transmitted signal, a beam receiver for receiving a signal reflected by an object in an area irradiated by the radar beam, and a processor for calculating the position of the object from the transmitted signal and the reflected signal, wherein at least one of the area irradiated by the beam transmitter and a receiving area of the beam receiver overlaps with an area over which a wiping member of the wiper device moves, and the method comprising:

activating the wiper device to move the wiping member;

radiating a radar beam by the beam transmitter and receiving the reflected signal by the beam receiver; and estimating that the radar apparatus is malfunctioning if a wiper passing signal to be detected does not appear in an output signal of the processor.

* * * * *